April 30, 1968     W. J. O'MILLIAN     3,380,189

FOLDED WING AEROSPACE CRAFT

Filed June 7, 1965

INVENTOR.
WILLIAM J. O'MILLIAN
BY *Duane C. Bower*
ATTORNEY

United States Patent Office 3,380,189
Patented Apr. 30, 1968

3,380,189
FOLDED WING AEROSPACE CRAFT
William J. O'Millian, 642 S. Hydraulic,
Wichita, Kans. 67211
Filed June 7, 1965, Ser. No. 461,978
12 Claims. (Cl. 46—80)

ABSTRACT OF THE DISCLOSURE

A folded wing model aircraft houses inertia operating means, keeper means and latch means (for permitting unfolding of wings, under force of a rubber band or the like, at the top of aircraft flight) in a thin, triangular sandwich inserted in a slot in the aircraft fuselage, and includes the features of a rearwardly extending weighted arm achieving inertia release by upward and forward pivoting, teeth on the inner ends of wings mating with grooves on a latch piece, and replaceable wing tips.

---

My invention relates to a folding wing aerospace model craft, such as a model or toy airplane. The invention includes housing the basic wing-folding parts in a replaceable sandwich, providing for wing release by latch means operating by inertia, and providing other novel mechanisms in the wind folding and release assembly.

There has been some prior development in folded wing toy airplanes but it appears the prior devices have certain deficiencies, such as having unduly heavy or complicated constructions, reliance on air pressure to keep wings folded until the top of the aircraft trajectory is reached, deficiencies in the means to try to release folded wings after launch, vulnerability to damage of working parts, restriction on adaptability to various desirable designs of aircraft, excessive cost, etc. It is the object of my invention to reach a solution to the above problems in an improved manner over prior designs.

Further objectives and advantages of my invention will be understood from the following description, read with reference to the drawings, in which.

Figure 1:
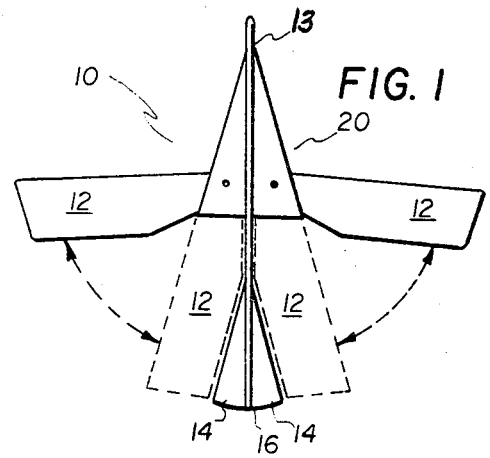
FIGURE 1 is a plan of view of one model of aerospace craft forming a specific embodiment of my invention, the wings being shown in extended position in full lines and being shown in folded position in dotted lines.

To explain the art of model aerospace craft, this is partly a hobby field and partly a toy field in which aircraft models or the like, usually made of balsa wood, are built specially or are purchased from stock partly or wholly complete. Of course, part of the models can be of rockets or other aerospace craft rather than conventional airplanes.

My invention concerns a type of model airplane or the like in which the craft is launched with a rubber band attached to a stick at one end, and fitting in a slot in the lower fuselage on the model aircraft. When the aircraft is shot into the air with such "sling-shot" type of propulsion, it will have a trajectory in a high arc as will be understood. To the extent the craft has ample wing surfaces, the craft will glide some distance after it reaches the top of the trajectory and noses over for descent. One desirable objective, of course, is to maximize the flight, particularly the glide. In sophisticated hobby aircraft this distance can be a quarter of a mile, more or less, whereas in toys the distances may be considerably shorter.

The wing areas are largely responsible for the length of glide and the larger the area the better. In the initial trajectory, however, the wings add drag to the craft and minimize the height of rise. This is why folded wing aircraft have been devised, more or less to delay wing opening until the descent begins. Of course aircraft relying on purely air resistance to hold the wings back will have wing unfolding before the top of the trajectory. My invention is in a folded wing craft which preferably delays wing unfolding until the top of the rise.

Even with a rocket (which may have a rocket type propellant instead of being launched by rubber band), wings (folded or hidden during ascent) may be desirable to lengthen the flight and have a primary purpose to achieve a slower descent to minimize injury to the craft. In a model aircraft the wings serve both purposes, to lengthen the flight and to avoid damage. At best, the aircraft will land with considerable velocity and may strike objects which may damage the aircraft. It is particularly desirable to reduce vulnerability of wing release mechanisms and the like so that the repairs may be minimized and so that the more expensive items of construction will be least likely to be damaged.

With my construction (in providing a self-contained or cartridge type removable and replaceable wing-folding and release mechanism), several benficial results are achieved: (1) This permits the unit to be housed in a manner minimizing damage to the more complex, sensitive and expensive wing folding and release parts. (2) The folding and release assembly may be made mostly of plastic which is somewhat stronger than balsa wood or the like (most model aircraft parts are commonly made of balsa wood) without gaining excessive weight. The plastic parts are susceptible of high rate, low cost production. (3) The assembly can be readily installed and removed. For example, the folding and releasing assemblies may be sold separately and within their lifetimes may be used in a number of different aircraft, either in model aircraft purchased or in model aircraft constructed by the hobbiest.

Figure 3:
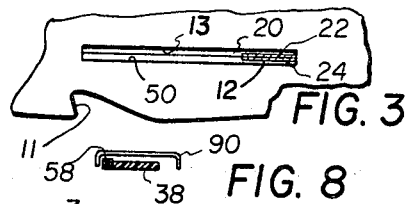
FIGURE 3 is a side view of the construction shown in FIGURE 2 together with a fragmentary showing of other structure.

To now turn to a description of the specific embodiment of the invention shown in the drawing, a folded wing aircraft 10 is shown. It has some resemblance to certain aircraft presently proposed for supersonic transport aircraft. The wings 12 are shown in full lines in extended position and are shown in dotted lines in folded position. The fuselage 13 and tail horizontal and vertical stabilizers 14, 16 are not detailed as they are of conventional construction. Fuselage 13 has a slot 11 (FIGURE 3) in its forward end for the purpose of propelling the craft with a "slingshot" type launcher in the manner previously described.

The basic wing hinging and release mechanism is housed in a thin, triangular sandwiched housing 20 having upper and lower top and bottom plates 22, 24 respectively. Except as otherwise noted, it may be assumed that housing 20 and all the parts in the housing are formed of plastic and it will be understood that these can be made economically, with high production rates and low costs.

Figure 9:
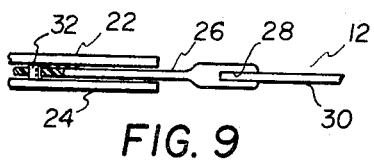
FIGURE 9 is a view of a portion of the sandwiched construction and the wing and showing a stub wing fitting with a balsa outer wing member by means of a slot receiving the outer wing.

FIGURE 9 shows the construction of the wings with inner plastic stubs 26, slotted at 28 to receive removable and replaceable balsa wood wing ends 30. This means the wing ends, most susceptible to damage in landings, can be replaced. A basic cartridge can be sold consisting of housing 20, the parts within housing 20, and wing stubs 26, and various sizes and shapes of outer wings 30 can be used with the same cartridge.

Figure 2:
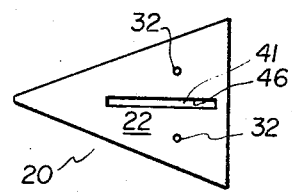
FIGURE 2 is a plan view of the removable sandwiched assembly housing the wing folding and release mechanisms
Figure 5:
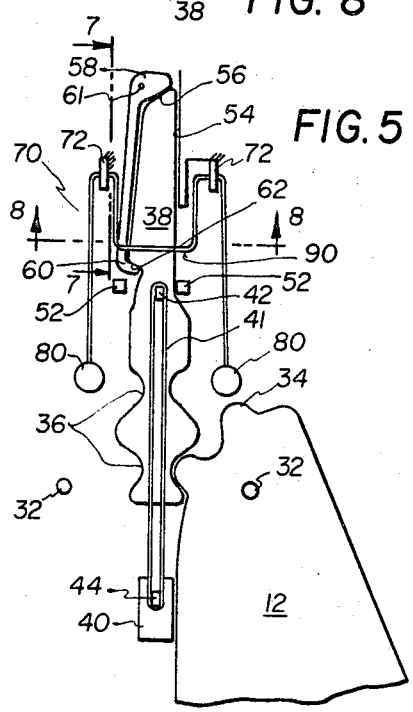
FIGURE 5 is a view similar to that of FIGURE 4, only with part of the assembly omitted and with the wing in folded position.

Wings 12 are pivoted on pins 32 which may be formed of plastic from bottom plate 24 and extend up through openings in upper plate 22. The inner ends of wings 12 have gear teeth-like grooves and protuberances at 34, which mate with grooves 36 on sliding latch piece 38, whereby the wings may pivot from extended to folded position and will move together because of the common engagement with sliding latch piece 38. Forward extension of the wings is limited by the abutment of latch piece 38, with abutment 40 formed on lower plate 24. As shown in FIGURE 5, the sides of abutment 40 may also serve as limits on the folding of wings 12. Latch piece 38 is normally biased to contact abutment 40 (and the wings are normally urged to extended position) by a rubber band or other elastic band 41 extending between a block 42 on piece 38 and a block 44 on abutment 40. The band 41 can be replaced through a slot in upper plate 22 (see FIGURE 2) without disassembly of plates 22, 24, if desired. Upper and lower plates 22 and 24 may be secured together by any suitable means, or may be merely held together (press fit) within a slot 50 in fuselage 13 (see FIGURE 3).

As illustrated in FIGURE 5, when wings 12 are manually brought back into folded position and latch piece 38 is moved forward, stretching band 41 (guides for sliding movement of piece 38 may include abutment 52 and a portion 54 of housing 20), the forward end of 56 of latch piece 38, formed in a cam shape, strikes a dog 58 and pivots an end 60 of the dog into a mating groove 62 in latch piece 38, thereby locking latch piece 38 in its forward position and locking wings 12 in their folded position. Dog 58 is pivoted about a metal pin 61 embedded in bottom plate 24.

It will be observed from the foregoing that the assembly is complete with the exception of keeper and release means. This is provided by a wire inertia release means and keeper 70. Means 70 includes the wire bent generally into a U-shape, pivoted at the base of the U by pivotal supports 72 and the sides of the U forming arms 74 extending rearwardly and substantially horizontally (in horizontal disposition of the aircraft) from supports 72. Supports 72 may be formed by slotted blocks with larger inner ends on the slots so that the wire is forced through the slots and into the larger end parts of the slots where the wire will freely pivot. Metal weights 80 are secured to the ends of arms 74. Openings 84 may be provided in base 24 to the extent required to make room for weights 80. It will be understood that a different form of arm could be substituted for wire portion 74 and weight 80, that could have similar operating characteristics by being shaped to have similar inertial characteristics.

Figure 6:
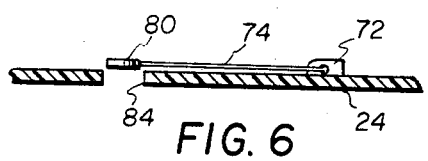
FIGURE 6 is a view partly in section taken on line 6—6 of FIGURE 4.

The inertia means which consists of wire arms 74 and weights 80 are substantially horizontally disposed in normal disposition of the aircraft, and are free to move only upwardly and only a short distance. (This movement could also be termed forwardly, i.e., if the arms were to have a normal position substantially raised from the view of FIGURE 6 it would be more evident that the release movement of the weights are forward as well as upward. The substantially horizontal position is advantageous for several reasons, however, i.e., (1) the horizontal housing 20 in effect acts as a wing and is understandably aerodynamically advantageous, and (2) the inertial release arms work better if substantially aligned with the aircraft longitudinal centerline because this tends to require "nosing over" as well as slowing down of the craft in order to obtain inertial movement—mere slowing down produces forces mostly going through the pivotal axes of the inertia arms.) The weighted arms are properly termed an inertia mechanism as it will be observed the weights 80 will only move upwardly in a latch-release movement responsive to inertia, meaning some slowing down of the aircraft and a nosing over. When designed in the proportions shown, this will occur usually about the top of the rise of the aircraft when the craft starts substantially nosing over and slowing down. If the weight is too little, this will occur earlier in the trajectory with only the air pressure to hold the wings back. Preferably the wings will not open until the aircraft has reached close to zero upward velocity and starts to nose over for the downward descent. (It is already known in the art how to weight such a model aircraft to insure the nosing over and no disclosure is needed in this application other than to say an adjustable weight may be clipped to fuselage 13 in the nose portion of the aircraft for this purpose, as is common in the art.)

The keeper portion of the mechanism is formed by return bends, forming the portion 90, which extend from pivotal supports 72 rearwardly and then across valve piece 38. It will be noted (from FIGURE 8 and FIGURE 7 particularly) that keeper portion 90 is shaped to extend over dog 58 whereby it will keep the dog in place in the FIGURE 5 disposition until arms 74 pivot upwardly, releasing dog 58. End 60 of dog 58 then cams out of groove 62, permitting latch piece 38 to move from the FIGURE 5 to the FIGURE 6 position opening wings 12.

It will be observed that the mechanism is characterized by the compact triangular sandwich 20, and by quick and positive release when the inertia on weights 80 and arms 74 is sufficient to overcome gravity. The trajectory of a craft is at some angle to the vertical in initial rise and hence weights 80 will be subjected to some gravity tending to hold the mechanism in the FIGURE 5 kept position, and inertial forces are required for release to overcome gravitational forces.

To further review the operation (which is largely explained in the above discussion of structure), the areospace craft can be of any type that is desired to be projected into the air with a sling-shot type mechanism or by other propulsion and to have wings for descent. Package 20 may be used interchangeably in a variety of vehicles, and includes with it wing pivot means, latch means including keeper means, and inertial release means.

The wings are in the dotted line position of FIGURE 1 upon launch or may be brought further into the body if desirable, as in the case of a rocket.

Figures 7, 8:
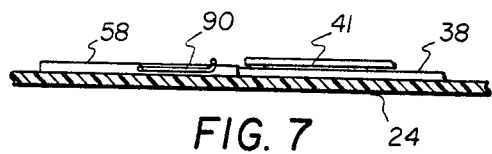
FIGURE 7 is a view partly in section taken on line 7—7 of FIGURE 5.
FIGURE 8 is a view partly in section taken on line 8—8 of FIGURE 5.

FIGURE 5 shows the position of the latch mechanism upon take-off. Elastic band 41 is tending to bring wing 12 to forward position, but this is restrained by end 60 of dog 58, in groove 62 of latch piece 38, dog 58 being kept in place by keeper wire portion 90 as shown in FIGURES 7 and 8.

Figure 4:
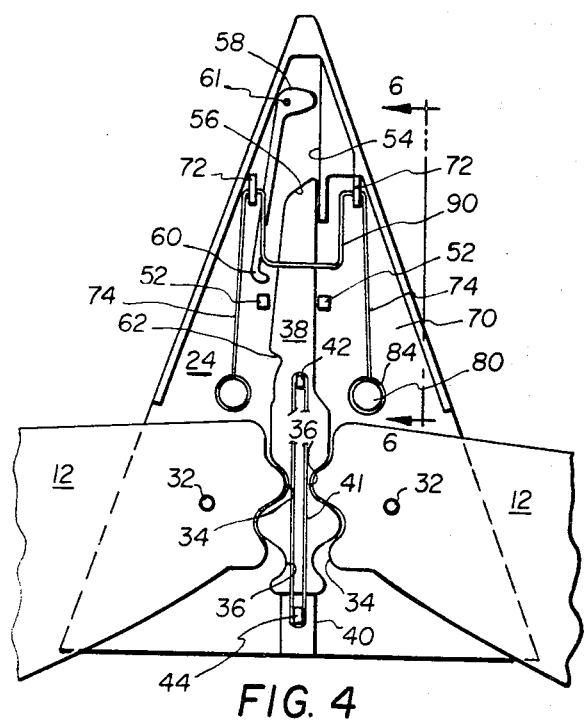
FIGURE 4 is an enlarged fragmentary plan view of the assembly shown in FIGURE 2 (but with the top cover plate removed) and showing parts of wings in place in the assembly in extended position.

During flight, when inertia on weighted arms 74 overcomes gravity, near the top of the rise of the craft, weights 80 and arms 74 pivot upwardly (forwardly or clockwise in FIGURE 6) slightly permitting end 60 of dog 58 to cam out of groove 62, thereby releasing latch piece 38 under the urging of band 41 to move to the FIGURE 4 position, whereby teeth 34 (generally concentric about pivots 32) are moved by the grooves 36 of latch piece 38 to move the wings to extended position. At this point, the aircraft will glide on a descent path until landing is completed.

To ready the craft for another take-off, wings 12 are manually brought back to the position in dotted lines in FIGURE 1, and the parts move from the FIGURE 4 to the FIGURE 5 position, the camming end 56 of latch piece 38 striking dog 58 which pivots under keeper 90 into groove 62 of latch piece 38, and keeper 90 falls into place keeping dog 58 in the FIGURE 5 position. Then the operation may be started over.

It will be observed from the foregoing how the objectives of the invention have been met and how various problems have been solved, including cartridge-like housing of latch and wing hinge mechanisms (so that they may be sold, etc., independently from models or materials for models), provision for replacement of wing tips, compactness and durability, and latch release by inertia at a proper place in aircraft trajectory or path. Of course the latch means, keeper means, and inertial latch release means could be used for other than wing release at the top of areospace craft trajectory, such as release of parachute. The mechanism can be used with a motor powered model aircraft, thereby providing folded wings during ascent and extended wings during descent.

Having thus described my invention, I do not wish to be understood as limiting myself to the precise details of construction shown, but instead wish to cover those modifications thereof that will accord to those skilled in the art after learning of my invention, and properly within the scope of my invention and as described in the appended claims.

I claim:

1. The improvement in a folded wing model areospace craft having a pair of wings hinged about axis and movable between a folded position and an extended position extending laterally relative to the areospace craft body, said wings being normally biased to said extended position and having latch means for latching said wings in said folded position, comprising:
    (A) inertia operating means including a pivotal support and a pivotal arm normally generally rearwardly extending and pivotal from said support about a horizontal axis in an upward direction for latch release
    (B) keeper means connected to said arm and movable thereby and said latch means being adapted to be secured by said keeper means in a first normal position thereof to latch said wings in folded position, said keeper means releasing said latch means as it moves from said first normal position
    (C) said inertia operating means pivoting upwardly responsive to slowing of said craft and the change of direction of the nose of the craft by virtue of the inertia of said arm thereby moving said keeper means releasing said latch means whereby the wings extend as the craft noses over and glides in descent.

2. The subject matter of claim 1 in which said inertia operating means, keeper means and latch means are housed in a thin housing of generally triangular form with the apex of the triangle directed forwardly whereby the housing has the function of a wing.

3. The improvement in an aerospace craft propelled in a trajectory having means to be released near the top of said trajectory and having latch means for latching said first-mentioned means, comprising:
    (A) inertia operating means including a pivotal support and a weighted pivotal arm normally generally rearwardly extending and pivotal from said support about a horizontal axis in an upward and forward direction for latch release
    (B) keeper means connected to said arm and movable thereby and said latch means being adapted to be secured by said keeper means in a first normal position thereof to latch said first-mentioned means, said keeper means releasing said latch means as it moves from said first normal position
    (C) said inertia operating means pivoting upwardly and forwardly responsive to slowing of said craft and the change of direction of the nose of the craft by virtue of the inertia of said arm thereby moving said keeper means releasing said latch means whereby said first-mentioned means is released as the craft noses over for descent.

4. The improvement in a folded wing model areospace craft having a pair of wings hinged about axis and movable between a folded position alongside the aerospace craft body and an extended position extending laterally relative to said body, said wings being normally biased to said extended position and having latch means for latching said wings in said folded position, comprising:
    (A) inertia operating means including a pivotal support, a pivotal arm elongated and normally aligned in a direction generally rearwardly of said body from said support and pivotal in an upward direction for latch release, and a weighted end on said arm
    (B) a latch keeper connected to said arm and pivotal therewith and said latch means being adapted to be secured by said keeper in a first normal position thereof to latch said wings in folded position, said latch keeper releasing said latch means as it pivots from said first normal position
    (C) the weighted end on said inertia operating means pivoting upwardly responsive to slowing of said craft and the change of direction of the nose of the craft by virtue of the inertia of said weighted end thereby pivoting said latch keeper sufficiently to release said latch means whereby the wings extend as the craft noses over and glides in descent.
    (D) said pivotal arm being a generally U-shaped wire with the base of the U-shape being journaled in said pivotal support and the weighted ends being weights secured to each end of said wire.

5. The subject matter of claim 4 in which said base of the W-shape of said wire has a return bend forming said latch keeper, said latch means included a pivotal dog adapted to be caught and retained by said return bend in said first normal position of said keeper, and a slidable latch piece having a groove adapted to receive said dog in said first normal position of said keeper, said latch piece being connected to said wings whereby said wing can only move as said latch piece moves, and resilient means biasing said latch piece into a position wherein said wings are extended, said dog when secured in said groove by said keeper holding said latch piece against movement by said resilient means and thereby holding said wings in folded position.

6. The subject matter of claim 5 in which said latch piece and said dog have camming mating ends disposed to pivot said dog in position to be caught by said keeper and disposing said dog in said groove as said wings are manually moved from said extended position to said folded position against the force of said resilient means.

7. The subject matter of claim 5 in which said resilient means is an endless elastic band attached to said latch piece and to said craft.

8. The improvement in a folded wing model aerospace craft having a pair of wings hinged about axis and movable between a folded position alongside the aerospace craft body and an extended position extending laterally relative to said body said wings being normally biased by biasing means to said extended position and having latch means for latching said wings in said folded position, comprising:
    (A) a thin, flattened, generally-triangular, sandwiched, removable housing extending through and secured in said body and containing therein journal means for said winggs, said biasing means for said wings, and said latch means
    (B) said wings having inner slotted stub ends and removable outer wing portions secured in the slots of said stub ends.

9. The improvement in a folded wing model aerospace craft having a pair of wings hinged about axis and movable between a folded position alongside the aerospace craft body and an extended position extending laterally relative to said body said wings being normally biased to said extended position and having latch means for latching said wings in said folded position, comprising:
    (A) a thin flattened housing extending through said body and containing therein journal means for said wings and said latch means
    (B) said housing being generally triangular in shape with the apex of the triangle directed forwardly and being symmetrically disposed relative to the longitudinal axis of said craft, whereby said housing has the form of a delta wing.

10. The improvement in a folded wing model aerospace craft having a pair of wings hinged about axis and movable between a folded position alongside the aerospace craft body and an extended position extending laterally relative to said body, said wings being normally biased to said extended position and having latch means for latching said wings in said folded position, comprising:

(A) the inner ends of said wings having gear-like teeth disposed generally concentrically about the pivotal axis of said wings (B) a latch piece slidable longitudinally of said body and guides therefor and abutment means in a rearward direction and said latch piece being grooved to mate with the teeth on said wings whereby said wings pivot as said latch-piece moves between said extended wing position when said latch piece is against said abutment means and said folded wing position when said latch piece is in its forwardmost position (C) resilient means for normally biasing said latch piece to a position against said abutment means (D) said latch means being operable to latch said latch piece in said forwardmost position and being releasable during flight to permit said wings to move from said folded position to said extended position.

11. The improvement in a folded wing model aerospace craft having a pair of wings hinged about axis and movable between a folded position alongside the aerospace craft body and an extended position extending laterally relative to said body, said wings being normally biased to said extended position and having latch means for latching said wings in said folded position, comprising:

(A) said latch means including a latch piece slidable longitudinally of said body and guides therefor and abutment means in one direction and said latch piece being connected to said wings to control the pivoting of said wings between said extended wing position when said latch piece is against said abutment means and said folded wing position when said latch piece is in its position farthest from said abutment means (B) resilient means for normally biasing said latch piece to a position against said abutment means (C) said latch means being operable to latch said latch piece in said position farthest from said abutment means and being releasable during flight to permit said wings to move from said folded position to said extended position.

12. The subject matter of claim 11 in which said latch means includes releasing means operating by inertia to release said latch piece.

References Cited

UNITED STATES PATENTS

| | | | |
|---|---|---|---|
| 2,417,267 | 3/1947 | Porter | 46—80 |
| 3,222,817 | 12/1965 | Brandstetter | 46—80 |

FOREIGN PATENTS 141,916  11/1930  Switzerland.

LOUIS G. MANCENE, *Primary Examiner.*

C. R. WENTZEL, *Assistant Examiner.*